(12) United States Patent
Kim et al.

(10) Patent No.: US 9,100,632 B2
(45) Date of Patent: Aug. 4, 2015

(54) METHOD FOR PROVIDING VIDEO CALL ANALYSIS SERVICE AND AN ELECTRONIC DEVICE THEREOF

(71) Applicant: Samsung Electronics Co. Ltd., Suwon-si, Gyeonggi-do (KR)

(72) Inventors: Hyung-Joon Kim, Hwaseong-si (KR); Young-Joo Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 104 days.

(21) Appl. No.: 13/917,154

(22) Filed: Jun. 13, 2013

(65) Prior Publication Data

US 2014/0002573 A1    Jan. 2, 2014

(30) Foreign Application Priority Data

Jul. 2, 2012    (KR) .................. 10-2012-0071955

(51) Int. Cl.
  *H04N 7/14*    (2006.01)
  *H04N 17/00*    (2006.01)
(52) U.S. Cl.
  CPC ............... *H04N 17/00* (2013.01); *H04N 7/147* (2013.01)

(58) Field of Classification Search
  CPC ......... H04N 7/14; H04N 7/141; H04N 7/142; H04N 7/144; H04N 7/147; H04N 17/00
  USPC ............................................ 348/14.01–14.16
  See application file for complete search history.

(56) References Cited

U.S. PATENT DOCUMENTS

2007/0200916 A1    8/2007    Han
2010/0253689 A1*   10/2010   Dinicola et al. ............. 345/467
2013/0148798 A1*   6/2013    Ellsworth et al. ............ 379/133

FOREIGN PATENT DOCUMENTS

JP    2006-061632 A       3/2006
WO    WO 2012089906 A1 *  7/2012

* cited by examiner

*Primary Examiner* — Melur Ramakrishnaiah
(74) *Attorney, Agent, or Firm* — Jefferson IP Law, LLP

(57) ABSTRACT

A method and an electronic device for providing a video call analysis service are provided. The method includes receiving video call data, detecting an emotional change of a call party using the received video call data, and, when the emotional change is detected, storing the video call data at a time point at which the emotional change is detected.

20 Claims, 14 Drawing Sheets

METHOD FOR PROVIDING VIDEO CALL ANALYSIS SERVICE AND AN ELECTRONIC DEVICE THEREOF

PRIORITY

This application claims the benefit under 35 U.S.C. §119 (a) of a Korean patent application filed on Jul. 2, 2012 in the Korean Intellectual Property Office and assigned Serial No. 10-2012-0071955, the entire disclosure of which is hereby incorporated by reference.

BACKGROUND OF THE INVENTION

1. Field of the Invention

The present invention relates to a method and a device for providing a video call analysis service.

2. Description of the Related Art

Electronic devices have evolved into multimedia electronic devices by providing a data transmission service and various supplementary services as well as a voice call service. Furthermore, electronic devices have become a necessity due to their portability and various services.

Such electronic devices have been developed to additionally provide various functions, such as a data communication service, as well as a voice communication service due to the development of data transmission technologies. For example, the electronic devices can provide a video call service using the data communication service. In this case, the video call service represents a service for allowing users to communicate with each other while looking at moving video images of each other during the call.

As described above, with the development of video based communication service technologies as well as voice based communication services, the user of the electronic device requires various user interfaces for utilization of video call services.

Therefore, a need exists for a device and a method for providing a video call analysis service in an electronic device.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above problems and/or disadvantages and to provide at least the advantages below. Accordingly, an aspect of the present invention is to provide a device and a method for providing a video call analysis service in an electronic device.

Another aspect of the present invention is to provide a device and a method for estimating an emotion of a call party using video call data in an electronic device.

Another aspect of the present invention is to provide a device and a method for detecting an emotional change of a video call party in an electronic device.

Another aspect of the present invention is to provide a device and a method for storing video call data at a time point at which the emotional change of a video call party is detected.

Another aspect of the present invention is to provide a device and a method for storing emotion estimation information at a time point at which the emotional change of a video call party is detected.

In accordance with an aspect of the present invention, a method for providing a video call analysis service is provided. The method includes receiving video call data, detecting an emotional change of a call party using the received video call data, and, when the emotional change is detected, storing the video call data at a time point at which the emotional change is detected.

In accordance with another aspect of the present invention, an electronic device is provided. The electronic device includes at least one processor, a memory, and at least one program stored in the memory and configured to be executable by the processor, wherein the at least one program includes at least one instruction to receive video call data, detect an emotional change of a call party using the received video call data, and, when the emotional change is detected, store the video call data at a time point at which the emotional change is detected.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following description taken in conjunction with the accompanying drawings in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Hereinafter, an exemplary method for providing a video call analysis service in an electronic device will be described.

In the following description, an electronic device includes a mobile terminal, a Personal Digital Assistant (PDA), a laptop computer, a smart phone, a netbook, a television, a Mobile Internet Device (MDI), an Ultra Mobile PC (UMPC), a tablet personal computer, a navigation device, a Motion Pictures Expert Group (MPEG-1 or MPEG-2) Audio Layer-3 (MP3) player, and the like.

Figure 1:
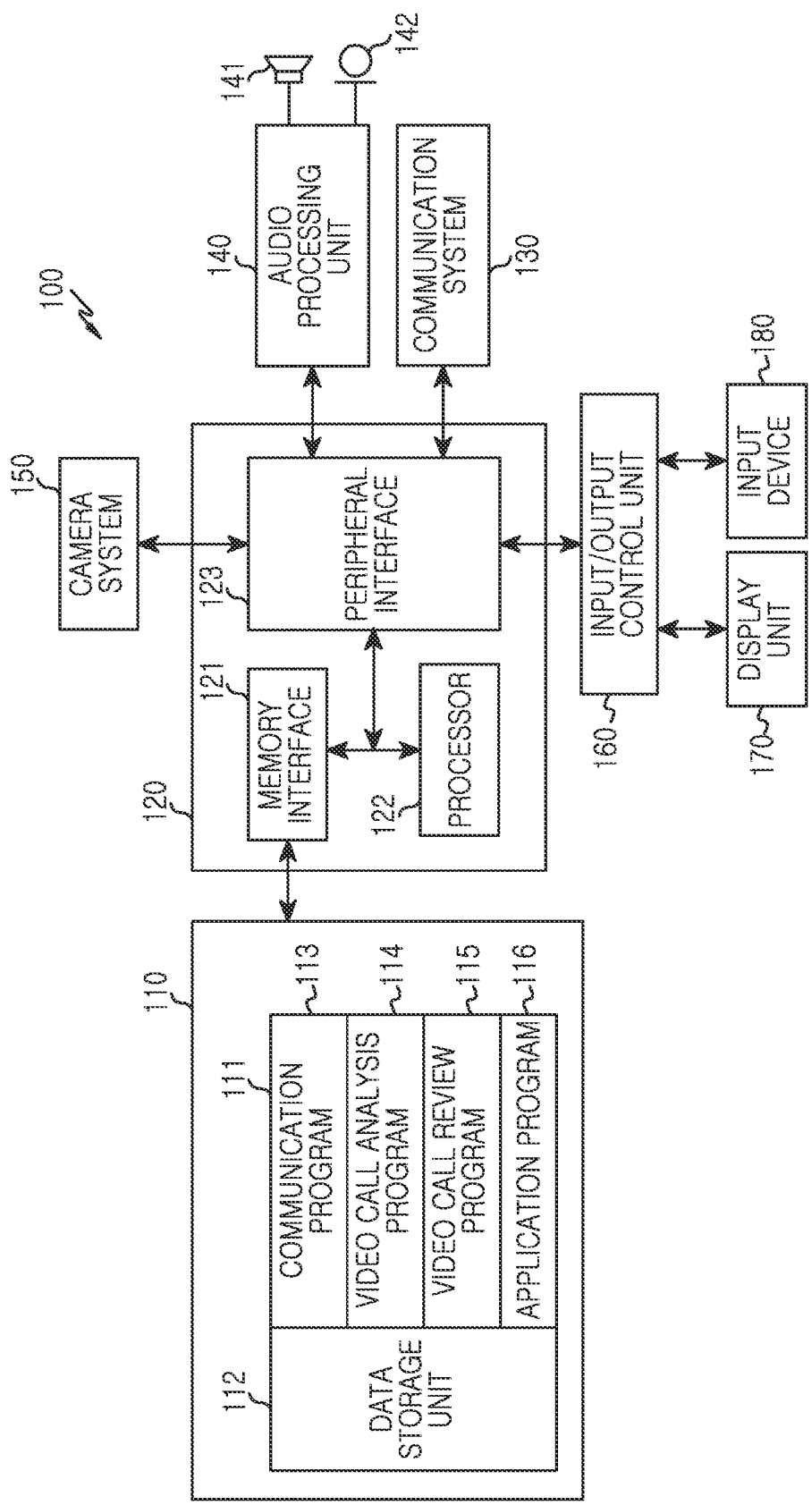
FIG. 1 is a diagram illustrating a block configuration of an electronic device according to an exemplary embodiment of the present invention.

FIG. 1 is a diagram illustrating a block configuration of an electronic device according to an exemplary embodiment of the present invention.

Referring to FIG. 1, the electronic device 100 includes a memory 110, a processor unit 120, a communication system 130, an audio processing unit 140, a camera system 150, an input/output control unit 160, a display unit 170, and an input device 180. In this case, the memory 110 may be implemented using a plurality of memories.

The memory 110 may include a program storage unit 111 for storing a program for controlling an operation of the electronic device 100, and a data storage unit 112 for storing data generated during the execution of a program. The data storage unit 112 stores facial expression sample information and video call data at the time point at which the emotional change of a call party is detected. For example, when a video call is performed with the call party through a communication program 113, the data storage unit 112 stores video call data during a reference interval set based on a current time point using a temporary buffer. In this case, the position of the reference interval is moving as the video call is continued in time. If information about detection of the emotional change is provided by a video call analysis program 114, the data storage unit 112 stores video call data stored in the temporary buffer as video call data at the time point at which the emotional change of the call party is detected. In another example, the data storage unit 112 stores video call data during the reference interval from a time point at which the information about the detection of the emotional change is provided by the video call analysis program 114 as video call data at the time point at which the emotional change of the call party is detected. In this case, the facial expression sample information represents data for estimating an emotional state based on the facial expression of the call party recognized through a video call screen in the electronic device 100. In addition, the electronic device 100 stores words and sentences used by the call party at the time point at which emotional change is detected. The program storage unit 111 includes the communication program 113, the video call analysis program 114, a video call review program 115, and at least one application program 116. In this case, the programs stored in the program storage unit 111 may be expressed as an instruction set that is a collection of instructions.

The communication program 113 includes at least one software component for processing data transmitted and received through the communication system 130. For example, the communication program 113 processes video call data received from a video call party.

Figure 9A:
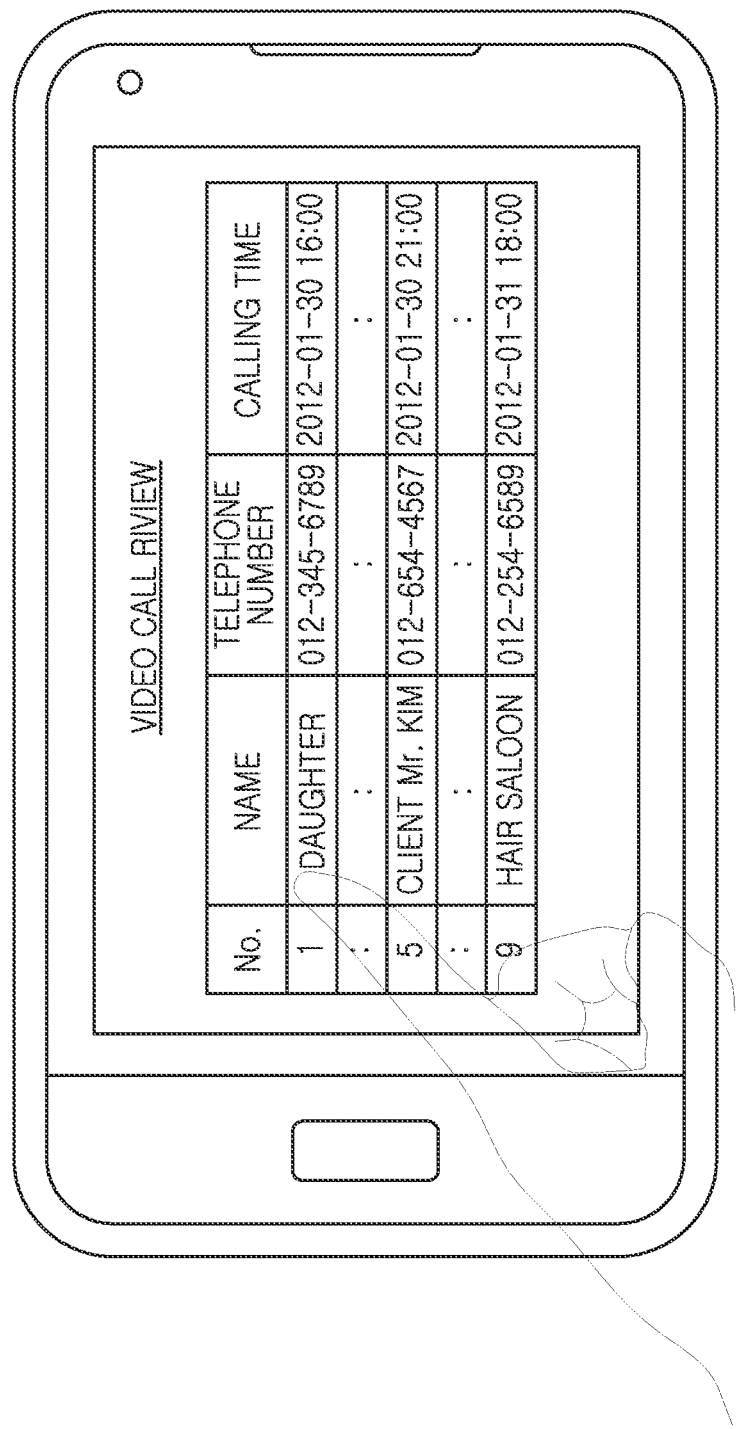
FIGS. 9A through 9C illustrate screen configurations for providing a video call review service in an electronic device according to an exemplary embodiment of the present invention.
Figure 9B:
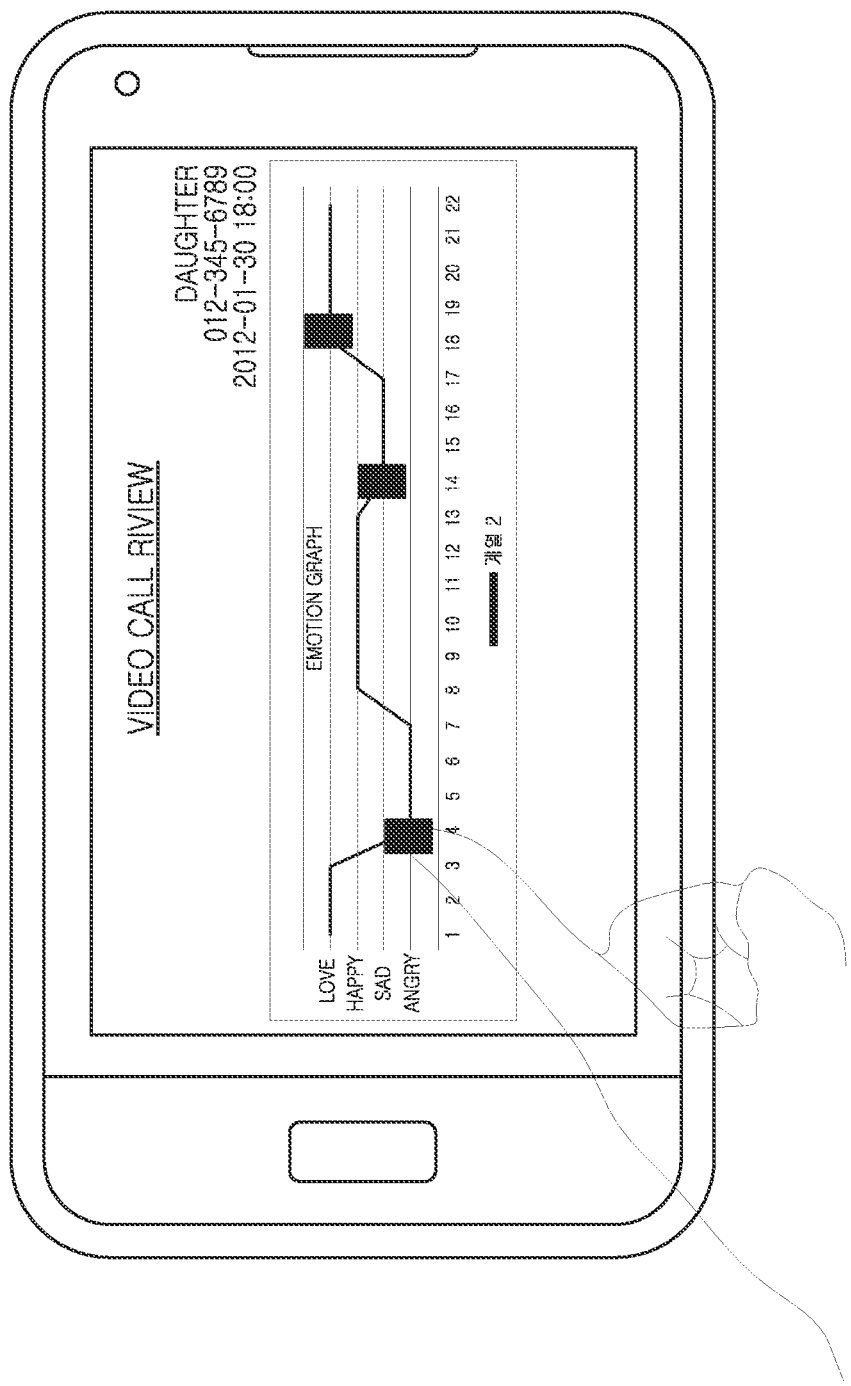
Figure 9C:
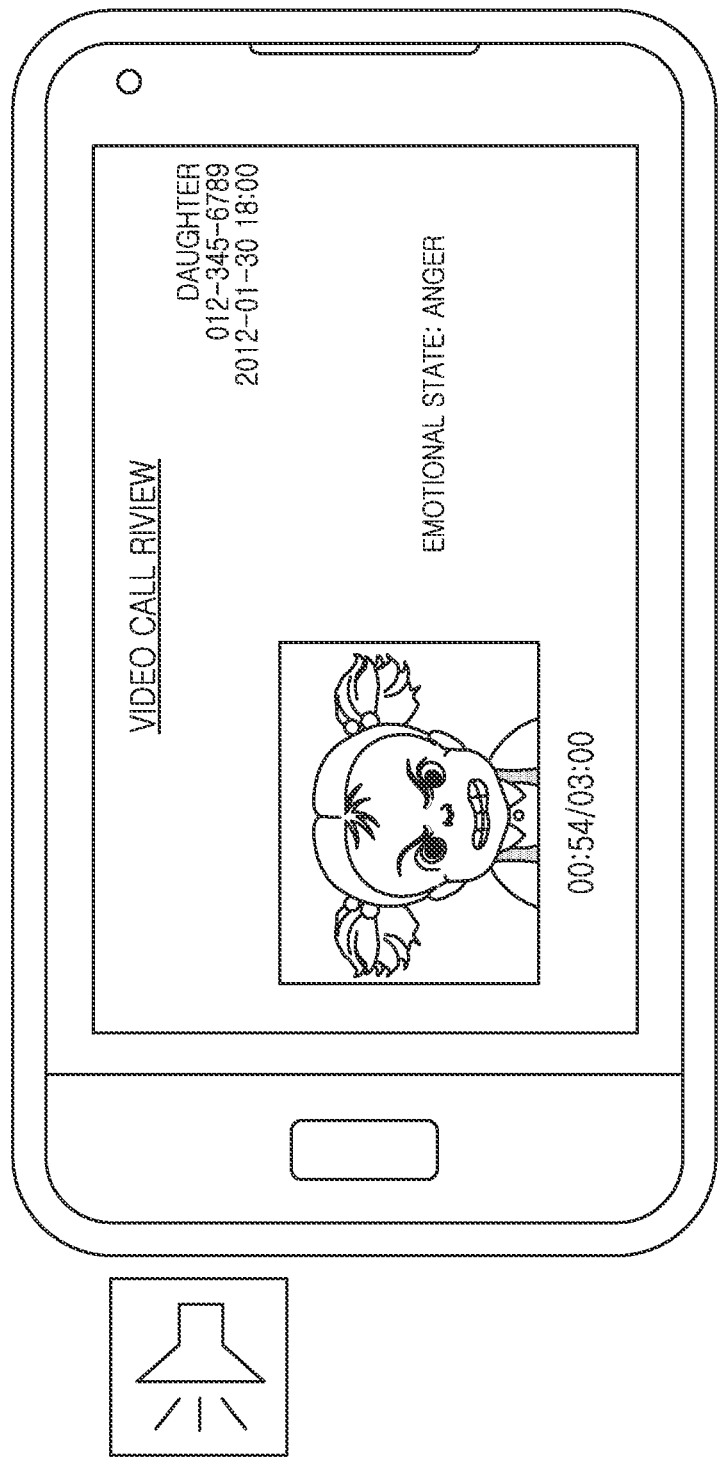

The video call analysis program 114 analyzes the video call data processed through communication program 113 and detects the emotional change of the call party. For example, the video call analysis program 114 recognizes the facial expression of the call party, performs comparison with the stored facial expression sample information, and estimates the emotional state of the call party. When the emotional change of the call party is detected, the video call analysis program 114 performs control to store the video call data at the time point at which the emotional change of the call party is detected. The video call review program 115 provides the video call data at the time point at which the emotional change of the call party is detected, which is stored in the data storage unit 112 to enable the user of the electronic device 100 to determine the video call data. For example, if there are many pieces of video call data in the data storage unit 112, the video call review program 115 displays a list of video call data as shown in FIG. 9A. When at least one piece of video call data is selected in the list of video call data, the video call review program 115 displays the video call data selected in the list of video call data on the display unit 170 as shown in FIG. 9C. In addition, the video call review program 115 may express the video call data as a graph of the emotional change with respect to talk time and display it on the display unit 170 as shown in FIG. 9B. In this case, the video call review program 115 may display the video call data corresponding to a time point selected by a user in the displayed graph of the emotional change.

The application program 116 includes a software component for one application program installed in the electronic device 100.

The processor unit 120 includes a memory interface 121, at least one processor 122 and a peripheral interface 123. In this case, the memory interface 121, the at least one processor 122, and the peripheral interface 123, which are included in the processor unit 120, may be integrated into at least one integrated circuit or be implemented as separate components.

The memory interface 121 controls access to the memory 110 of components, such as the processor 122 or the peripheral interface 123.

The peripheral interface 123 controls connections to the input/output peripherals, processor 122, and memory interface 121 of the electronic device 100.

Figure 2:
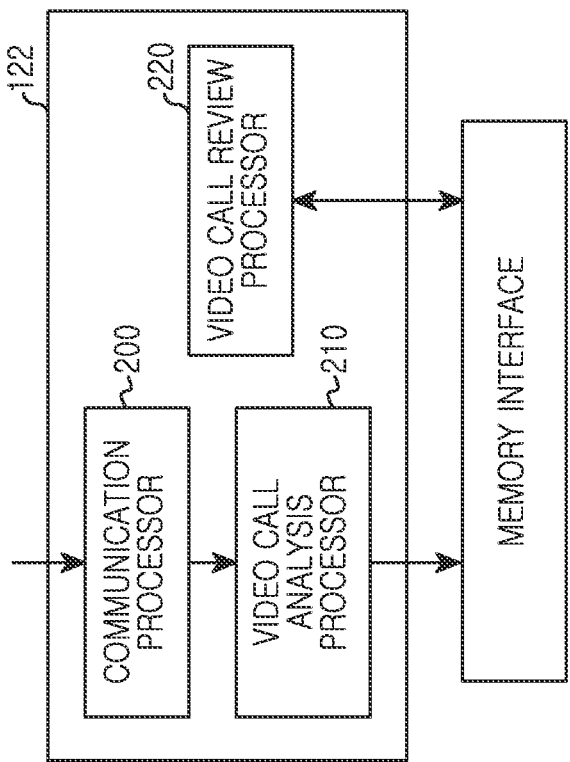
FIG. 2 is a block configuration of a processor according to an exemplary embodiment of the present invention.

The processor 122 enables the electronic device 100 to provide various multimedia services using at least one software program. In this case, the processor 122 performs control to execute at least one program stored in the memory 110 and provide a service according to a corresponding program. For example, the processor 122 includes a communication processor 200 for executing the communication program 113, a video call analysis processor 210 for executing the video call analysis program 114, and a video call review processor 220 for executing the video call review program 115 as shown in FIG. 2.

The communication system 130 executes communication functions for voice communication and data communication. For example, the communication system 130 transmits and receives video call data to and from the call party. In this case, the communication system 130 may be classified into a plurality of communication sub-modules which support different communication networks. In this case, communication networks may include, but not limited to, a Global System for Mobile communication (GSM) network, an Enhanced Data GSM Environment (EDGE) network, a Code Division Multiple Access (CDMA) network, a W-Code Division Multiple Access (W-CDMA) network, a Long Term Evolution (LTE) network, an Orthogonal Frequency Division Multiple Access (OFDMA) network, a wireless Local Area Network (LAN), a Bluetooth network, a Near Field Communication (NFC) network, and the like.

The audio processing unit 140 provides an audio interface between a user and the electronic device 100 through a speaker 141 and a microphone 142.

The camera system 150 performs a function for obtaining moving picture data and still picture data.

The input/output control unit 160 provides an interface between an input/output device, such as the display unit 170 and the input device 180, and the peripheral interface 123.

The display unit 170 displays the state information of the electronic device 100, characters input by the user, moving pictures, still pictures, or the like.

The display unit 170 may be implemented using a touch screen. In this case, the display unit 170 provides the touch information of the touch screen to the processor unit 120 through the control unit 160.

The input device 180 provides input data generated by the selection of the user to the processor unit 120 through the control unit 160. For example, the input device 180 is configured by including only control buttons for control of the electronic device 100. In another example, the input device 180 may be configured by a keypad for receiving input data from the user.

FIG. 2 is a block configuration of a processor according to an exemplary embodiment of the present invention.

Referring to FIG. 2, the processor 122 includes the communication processor 200, the video call analysis processor 210, and the video call review processor 220.

The communication processor 200 executes the communication program 113 of the program storage unit 111 to process video call data received from the video call party.

The video call analysis processor 210 executes the video call analysis program 114 of the program storage unit 111 to analyze the video call data processed through communication processor 200 and detect the emotional change of the call party. For example, the video call analysis processor 210 recognizes the facial expression of the call party, performs comparison with the facial expression sample information stored in the data storage unit 112 and estimates the emotional state of the call party. When the emotional change of the call party is detected, the video call analysis processor 210 performs control to store the video call data at the time point at which the emotional change of the call party is detected.

The video call review processor 220 executes the video call review program 115 of the program storage unit 111 to provide the video call data at the time point at which the emotional change of the call party is detected, which is stored in the data storage unit 112 in order to enable the user of the electronic device to determine the video call data. For example, if there are many pieces of video call data in the data storage unit 112, the video call review processor 220 displays a list of video call data as shown in FIG. 9A. When at least one piece of video call data is selected in the list of video call data, the video call review processor 220 displays the video call data selected in the list of video call data on the display unit 170 as shown in FIG. 9C. In addition, the video call review processor 220 may express the video call data as a graph of the emotional change with respect to talk time and display it on the display unit 170 as shown in FIG. 9B. In this case, the video call review processor 220 may display the video call data corresponding to a time point selected by a user in the displayed graph of the emotional change.

In the above-described exemplary embodiment, the electronic device 100 includes the communication program 113, the video call analysis program 114, and the video call review program 115, which provide a video call analysis service, in the program storage unit 111. As a result, the electronic device 100 enables the processor 122 configured as in FIG. 2 to execute the programs included in the program storage unit 111, thereby providing the video call analysis service.

In another exemplary embodiment, the electronic device 100 may enable the processor 122 including information about the communication program 113, the video call analysis program 114, and the video call review program 115 to provide the video call analysis service.

Figure 3:
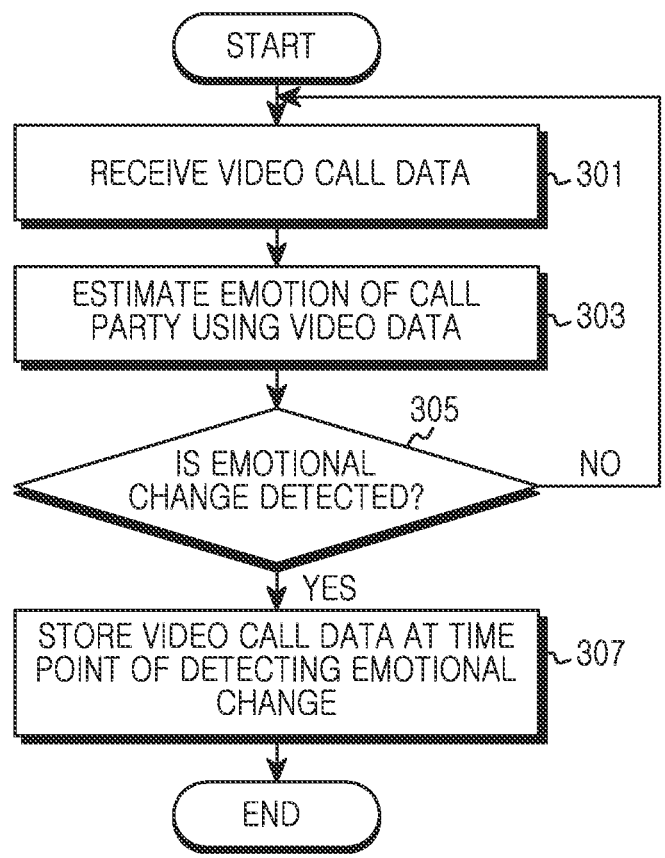
FIG. 3 illustrates a process for storing video call data in an electronic device according to a first exemplary embodiment of the present invention.
Figure 8A:
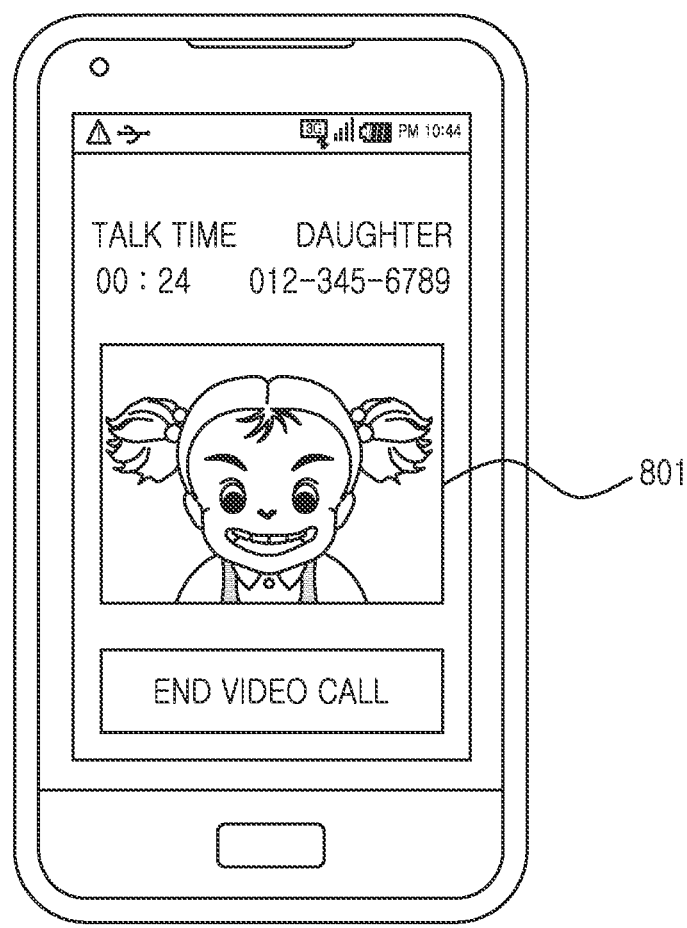
FIGS. 8A and 8B illustrate screen configurations for providing a video call service in an electronic device according to an exemplary embodiment of the present invention.
Figure 8B:
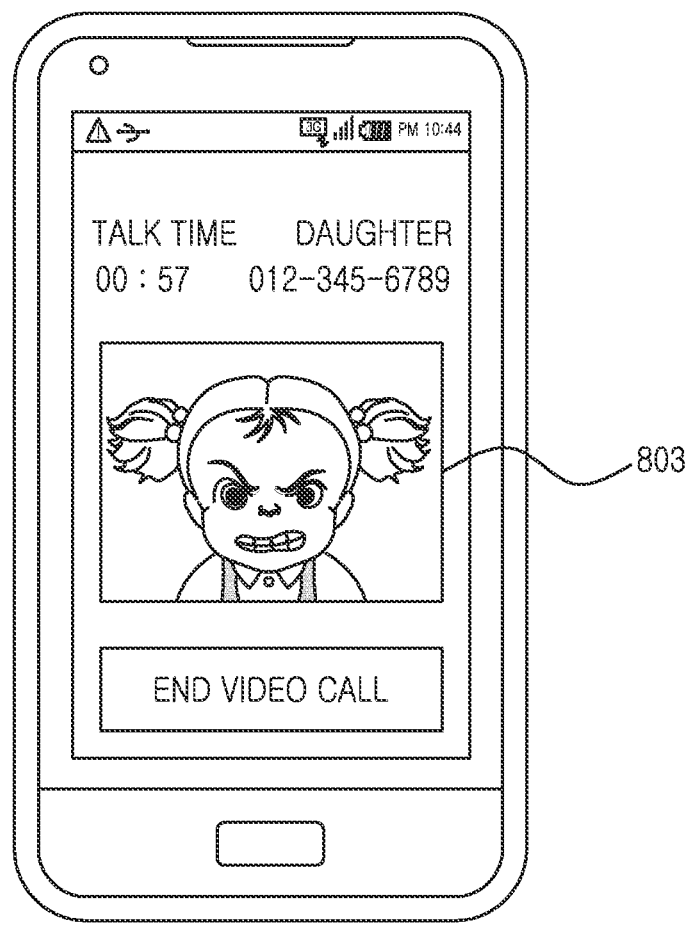

FIG. 3 illustrates a process for storing video call data in an electronic device according to a first exemplary embodiment of the present invention. FIGS. 8A and 8B illustrate screen configurations for providing a video call service in an electronic device according to an exemplary embodiment of the present invention.

Referring to FIGS. 3, 8A and 8B, the electronic device receives video call data from a video call party in step 301.

When the video call data is received, the electronic device proceeds to step 303. In step 303, the electronic device estimates the emotion of the call party using the video data received from the video call party. For example, when the facial expression of the party is a smile facial expression 801 on a video call screen as shown in FIG. 8A, the electronic device estimates that the emotional state of the call party is "happiness" using predefined facial expression sample information. In another example, when the facial expression of the party is an angry facial expression 803 on the video call screen as shown in FIG. 8B, the electronic device estimates that the emotional state of the call party is "anger" using the predefined facial expression sample information. In this case, the facial expression sample information represents data used to estimate emotional states based on the facial expression of the call party recognized through the video call screen in the electronic device.

When the emotion of the call party has been estimated, the electronic device proceeds to step 305. In step 305, the electronic device determines whether an emotional change is detected. For example, the electronic device determines whether the emotional state of the call party estimated in step 303 is different from the emotional state of the call party estimated before step 303. In this case, when the emotional states estimated at two time points are different from each other, the electronic device recognizes that the emotion of the call party has been changed. If the emotional change is not detected in the electronic device, the electronic device proceeds to step 301. In step 301, the electronic device receives the video call data.

On the other hand, if the emotional change is detected in the electronic device, the electronic device proceeds to step 307. In step 307, the electronic device stores the video call data at the time point at which the emotional change is detected. For example, the electronic device stores video call data in the data storage unit 112 during a reference interval from a time point at which the emotional change is detected. In this case, the reference interval represents a predefined interval before/after the time point at which the emotional change is detected, or a predefined interval starting from the time point at which the emotional change is detected. In addition, the electronic device stores emotion estimation information including words, sentences, and the like, used by the call party at the time point at which the emotional change is detected. Thereafter, the electronic device ends the algorithm.

In the above-described exemplary embodiment, the electronic device estimates emotion using video data.

In another exemplary embodiment, the electronic device estimates emotion using video and voice data.

Figure 4:
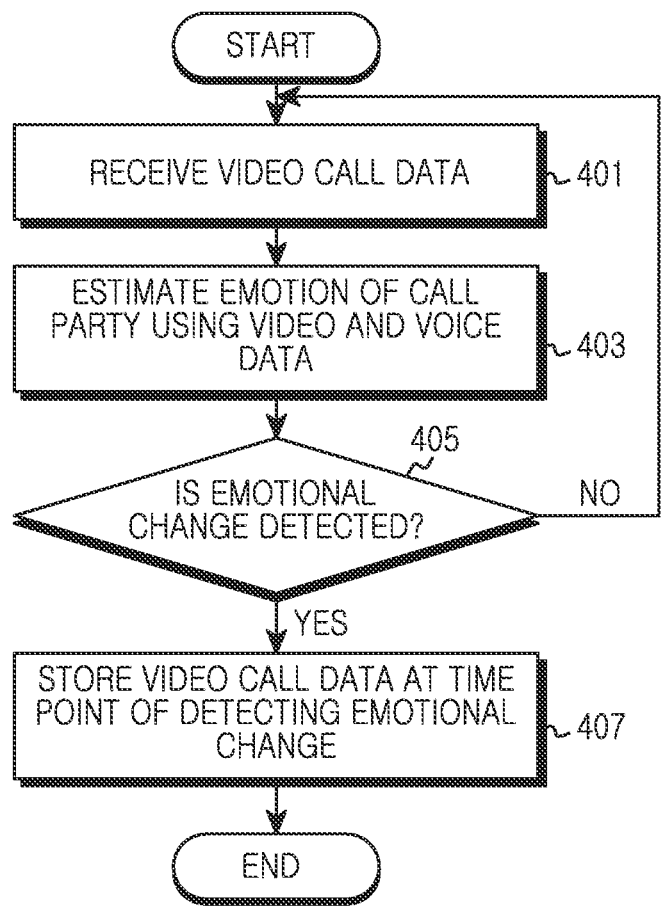
FIG. 4 illustrates a process for storing video call data in an electronic device according to a second exemplary embodiment of the present invention.

FIG. 4 illustrates a process for storing video call data in an electronic device according to a second exemplary embodiment of the present invention.

Referring to FIG. 4, the electronic device receives video call data from a video call party in step 401.

When the video call data is received, the electronic device proceeds to step 403. In step 403, the electronic device estimates the emotion of the call party using the video and voice data received from the video call party. For example, when the facial expression of the party is a smile facial expression 801 on a video call screen as shown in FIG. 8A, the electronic device estimates that the emotional state of the call party is "happiness" using predefined facial expression sample information. In another example, when the facial expression of the party is an angry facial expression 803 on the video call screen as shown in FIG. 8B, the electronic device estimates that the emotional state of the call party is "anger" using the predefined facial expression sample information. In another example, the electronic device recognizes words used by the call party, the intonation of the call party, the speech speed of the call party, the voice volume of the call party or the like to estimate the emotional state. In this case, the electronic device estimates the emotional state using both video data and voice data, thereby increasing accuracy of the estimated emotional state of the call party.

When the emotion of the call party has been estimated, the electronic device proceeds to step 405. In step 405, the electronic device determines whether an emotional change is detected. For example, the electronic device determines whether the emotional state of the call party estimated in step 403 is different from the emotional state of the call party estimated before step 403. In this case, when the emotional states estimated at two time points are different from each other, the electronic device recognizes that the emotion of the call party has been changed. If the emotional change is not detected in the electronic device, the electronic device proceeds to step 401. In step 401, the electronic device receives the video call data.

On the other hand, if the emotional change is detected in the electronic device, the electronic device proceeds to step 407.

In step 407, the electronic device stores the video call data at the time point at which the emotional change is detected. For example, the electronic device stores video call data during a reference interval from a time point at which the emotional change is detected in the data storage unit 112. In this case, the reference interval represents a predefined interval before/after the time point at which the emotional change is detected, or a predefined interval starting from the time point at which the emotional change is detected. In addition, the electronic device stores emotion estimation information including words, sentences, and the like, used by the call party at the time point at which the emotional change is detected. Thereafter, the electronic device ends the algorithm.

As described above, the electronic device stores video call data at the time point at which the emotional change of the call party is detected using the video call data. In this case, the electronic device may be configured by implementing respective means for storing the video call data respectively at every time points of detecting the emotional change of the call party using the video call data. Alternatively, the electronic device may be configured by integrating respective means for storing the video call data respectively at every time points of detecting the emotional change of the call party using the video call data into one means.

Figure 5:
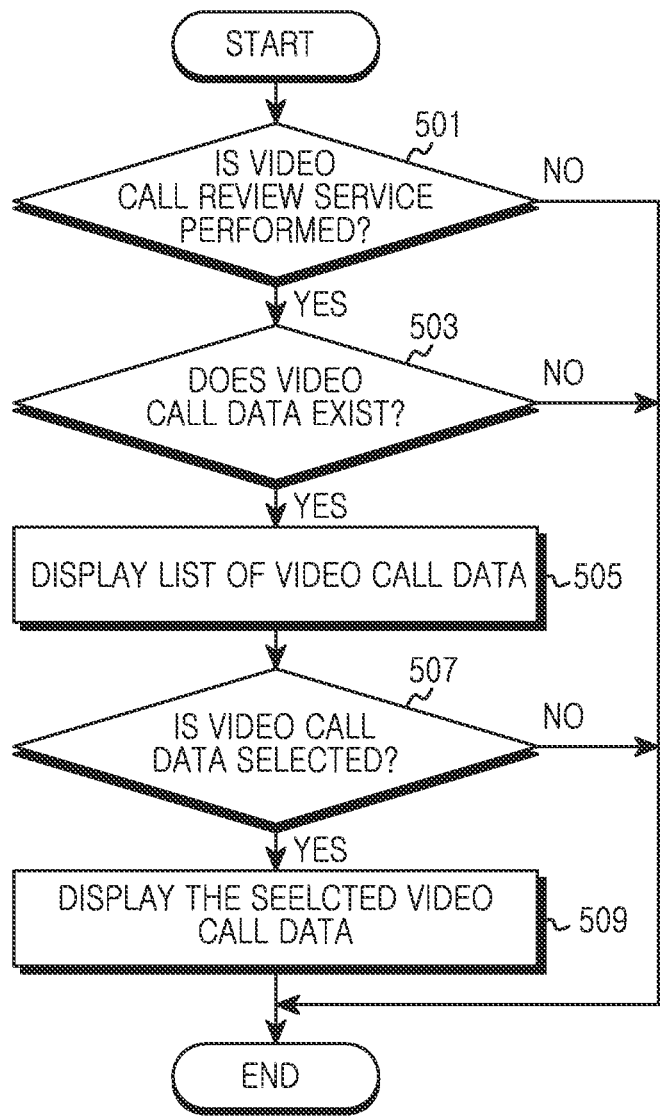
FIG. 5 illustrates a process for providing a video call review service in an electronic device according to an exemplary embodiment of the present invention.

FIG. 5 illustrates a process for providing a video call review service in an electronic device according to an exemplary embodiment of the present invention. FIGS. 9A through 9C illustrate screen configurations for providing a video call review service in an electronic device according to an exemplary embodiment of the present invention.

Referring to FIGS. 5 and 9A through 9C, the electronic device determines whether the video call review service is performed in step 501. For example, the electronic device determines whether a video call review service menu is selected by operation of a user. If the video call review service is not performed, the electronic device ends the algorithm.

On the other hand, when the video call review service is performed, the electronic device proceeds to step 503. In step 503, the electronic device determines whether there is video call data. For example, the electronic device determines whether video call data for the video call review service is stored in the data storage unit 112. If there is no video call data, the electronic device displays a message informing the user that there is no video call data stored at the time point at which the emotional change of the call party is detected on the display unit 170. Thereafter, the electronic device ends the algorithm.

On the other hand, when video call data exists, the electronic device proceeds to step 505. In step 505, the electronic device displays a list of video call data. For example, the electronic device displays the list of video call data for providing the video call review service on the display unit 170 as shown in FIG. 9A. In this case, the name and telephone number of the call party or a time point at which a call is started or ended may be included therein.

After the list of video call data has been displayed, the electronic device proceeds to step 507. In step 507, the electronic device determines whether the video call data is selected. For example, the electronic device determines whether at least one item is selected by a user among the list of video call data displayed on the display unit 170 as shown in FIG. 9A. If the video call data is not selected, the electronic device ends the algorithm.

On the other hand, when the video call data is selected, the electronic device proceeds to step 509. In step 509, the electronic device displays the selected video call data. For example, the electronic device displays the video call data selected among the list of video call data shown in FIG. 9A on the display unit 170 as shown in FIG. 9C. In another example, the electronic device may express the video call data as a graph of the emotional change with respect to talk time and display it on the display unit 170 as shown in FIG. 9B. In this case, the electronic device may display the video call data corresponding to a time point selected by a user in the displayed graph of the emotional change. Thereafter, the electronic device ends the algorithm.

In the above-described exemplary embodiment, the electronic device provides the stored video call data through the video call review service.

In another exemplary embodiment, the electronic device may use the video call data at the time point at which a message including a text is received.

Figure 6:
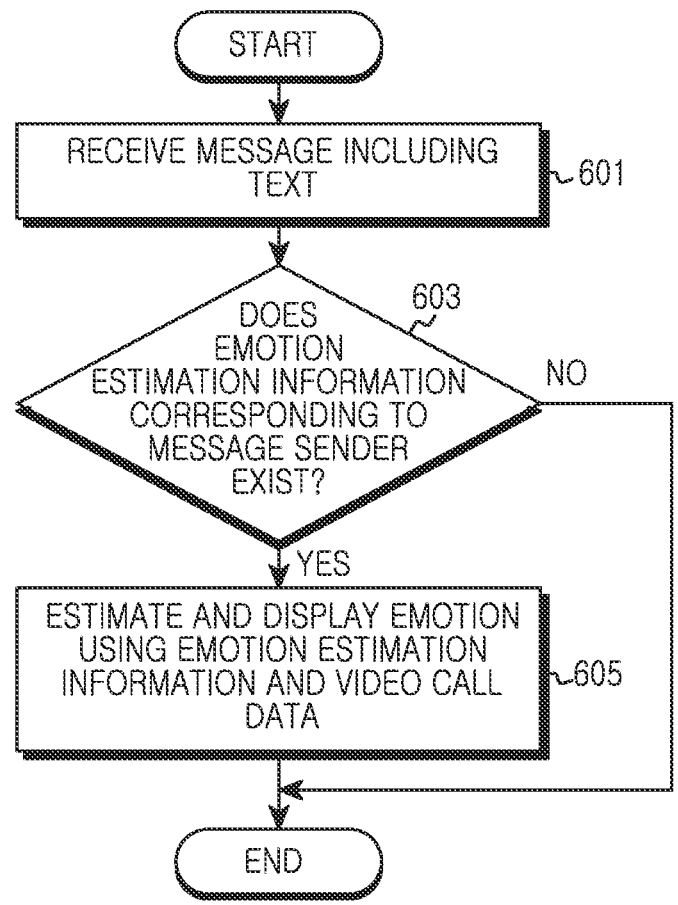
FIG. 6 illustrates a process for displaying emotion information in an electronic device according to a third exemplary embodiment of the present invention.
Figure 10:
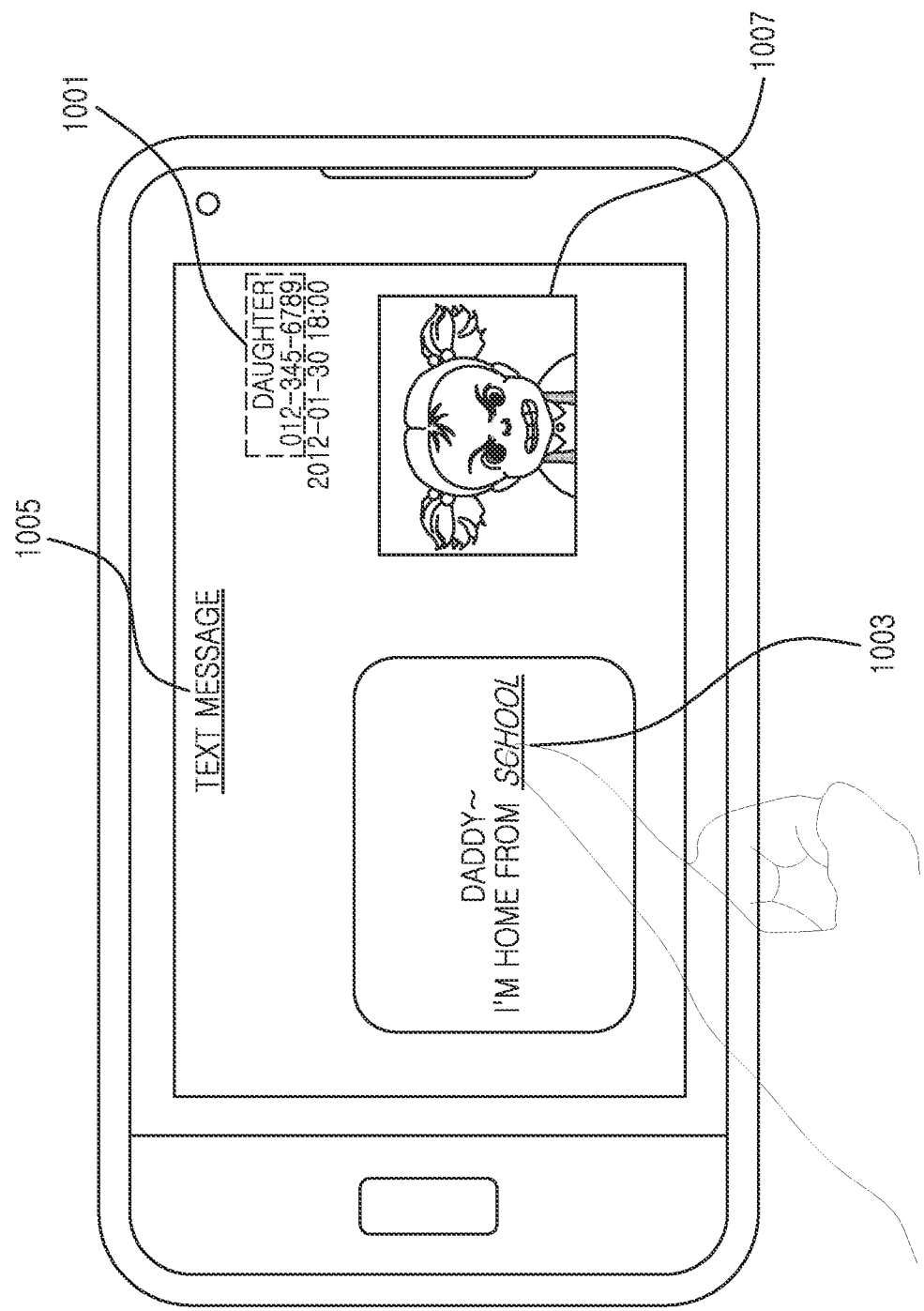
FIG. 10 illustrates a screen configuration for displaying emotion information in an electronic device according to the third exemplary embodiment of the present invention.

FIG. 6 illustrates a process for displaying emotion information in an electronic device according to a third exemplary embodiment of the present invention. FIG. 10 illustrates a screen configuration for displaying emotion information in an electronic device according to the third exemplary embodiment of the present invention.

Referring to FIGS. 6 and 10, the electronic device receives a message including a text in step 601. In this case, the message including a text represents at least one of a Short Message Service (SMS) message, a Long Message Service (LMS) message, a Concatenated SMS (CSMS) message, and a Multi-media Message Service (MMS) message.

After receiving the message, the electronic device proceeds to step 603. In step 603, the electronic device determines whether emotion estimation information corresponding to a message sender exists. For example, the electronic device identifies sender information included in the received message and determines whether the emotion estimation information corresponding to the sender is stored in the data storage unit 112. If the emotion estimation information does not exist, the electronic device ends the algorithm.

On the other hand, when the emotion estimation information exists, the electronic device proceeds to step 605. In step 605, the electronic device estimates and displays the emotion of the message sender using the emotion estimation information and video call data. For example, the electronic device estimates emotion for "school" 1003 based on emotion estimation information related to "daughter" 1001 when "school" 1003 is included in the message, as shown in FIG. 10. In this case, the electronic device displays a captured screen 1007 (i.e., a captured screen included in the video call data of "daughter" 1001) in consideration of the estimated emotion of "daughter" 1001 on a message application program 1005. As a result, the user of the electronic device can know the emotional state of "daughter" 1001 through the received message. Thereafter, the electronic device ends the algorithm.

Figure 7:
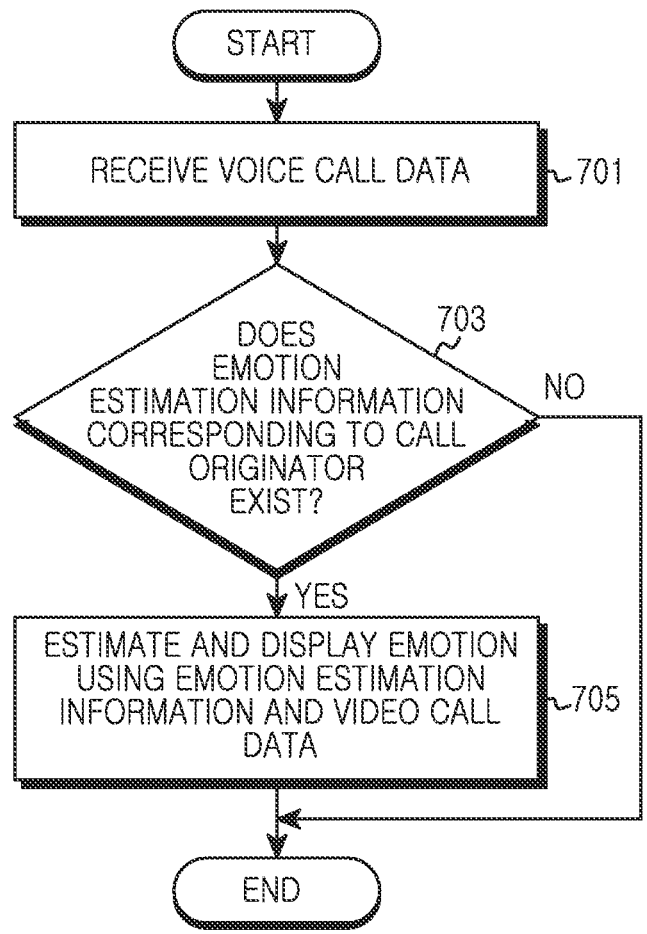
FIG. 7 illustrates a process for displaying emotion information in an electronic device according to a fourth exemplary embodiment of the present invention.
Figure 11:
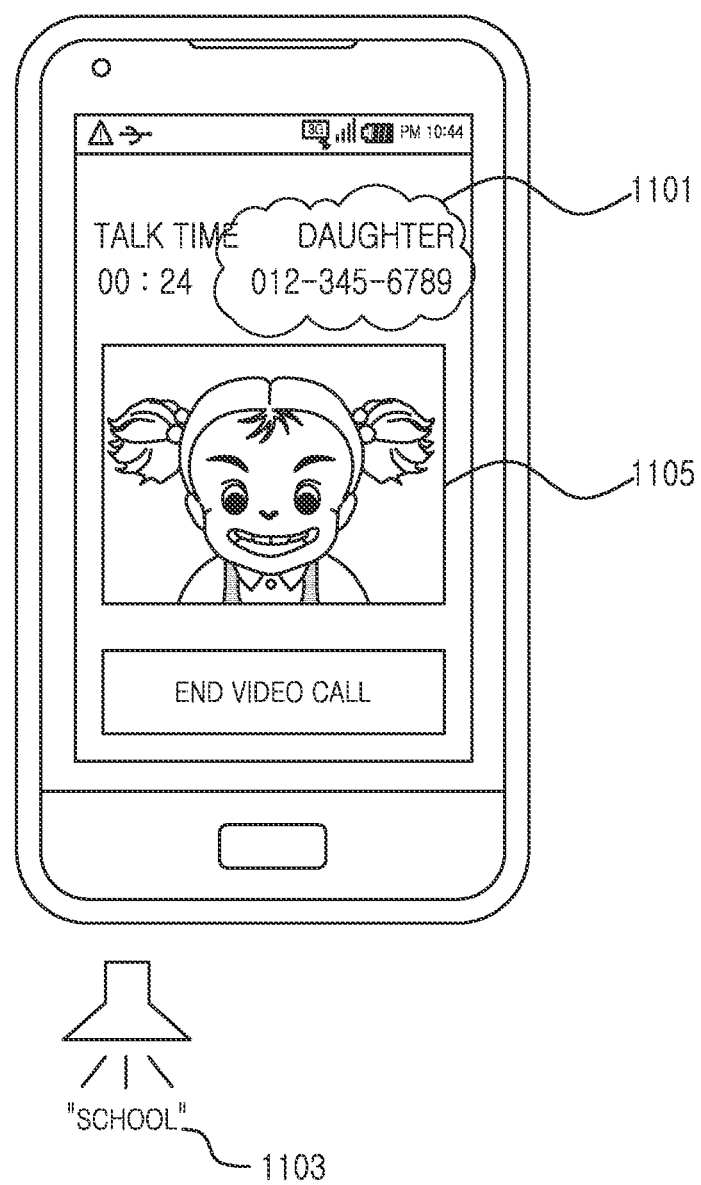
FIG. 11 illustrates a screen configuration for displaying emotion information in an electronic device according to the fourth exemplary embodiment of the present invention.

FIG. 7 illustrates a process for displaying emotion information in an electronic device according to a fourth exemplary embodiment of the present invention. FIG. 11 illustrates a screen configuration for displaying emotion information in an electronic device according to the fourth exemplary embodiment of the present invention.

Referring to FIGS. 7 and 11, the electronic device receives voice call data from a call party in step 701.

After receiving the voice call data, the electronic device proceeds to step 703. In step 703, the electronic device determines whether emotion estimation information corresponding to a voice call originator exists. For example, the electronic device identifies originator information included in the voice call data and determines whether the emotion estimation information corresponding to the originator is stored in the data storage unit 112. If the emotion estimation information does not exist, the electronic device ends the algorithm.

On the other hand, when the emotion estimation information exists, the electronic device proceeds to step 705. In step 705, the electronic device estimates and displays the emotion of the voice call originator using the emotion estimation information and video call data. For example, when "daughter" 1001 said "school" 1103 as shown in FIG. 11, the electronic device estimates emotion for "school" 1103 based on emotion estimation information related to "daughter" 1101. In this case, the electronic device displays a captured screen 1105 (i.e., a captured screen included in the video call data of "daughter" 1101) in consideration of the estimated emotion of "daughter" 1101 on a message application program 1105. As a result, the user of the electronic device can know the emotional state of "daughter" 1101 through the voice call data. Thereafter, the electronic device ends the algorithm.

Exemplary embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform exemplary methods of the present invention.

Such software may be stored in the form of a volatile or a non-volatile storage, such as a storage device like a Read Only Memory (ROM), whether erasable or rewritable, or in the form of a memory, such as a Random Access Memory (RAM), memory chips, a device or integrated circuits or on an optically or magnetically readable medium, such as a Compact Disc (CD), a Digital Versatile Disc (DVD), a magnetic disk, a magnetic tape, or the like. It will be appreciated that the storage devices and storage media are exemplary embodiments of machine-readable storage that are suitable for storing a program or programs comprising instructions that, when executed, implement exemplary embodiments of the present invention. Exemplary embodiments provide a program comprising a code for implementing an apparatus or a method as claimed in any one of the claims of this specification and a machine-readable storage for storing such a program. Furthermore, such programs may be conveyed electronically via any medium, such as a communication signal carried over a wired or wireless connection and exemplary embodiments suitably encompass the same.

The above-described electronic device provides a video call review service using video call data stored when the emotional change of a call party occurs, thereby enabling the user of the electronic device to recognize the tendency of the call party and perform a call while considering the tendency of the call party upon calling again.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:
1. A method for providing a video call analysis service in an electronic device, the method comprising:
  receiving video call data;
  detecting an emotional change of a call party using the received video call data; and when the emotional change is detected, storing the video call data at a time point at which the emotional change is detected.

2. The method of claim 1, wherein the detecting of the emotional change of a call party includes:
   estimating an emotion using video call data received at a first time point;
   estimating the emotion using video call data received at a second time point; and
   detecting the emotional change by comparing the emotion estimated at the first time point with the emotion estimated at the second time point.

3. The method of claim 2, wherein the first time point and the second time point are consecutive or are spaced apart from each other by a predefined time interval.

4. The method of claim 2, wherein the estimating of the emotion includes estimating the emotion of the call party using at least one piece of information of video information and voice information included in the received video call data.

5. The method of claim 1, wherein the storing of the video call data includes storing the video call data during a predefined reference interval before or after the time point at which the emotional change is detected.

6. The method of claim 1, wherein the storing of the video call data includes storing the video call data during a reference interval starting from the time point at which the emotional change is detected.

7. The method of claim 1, further comprising:
   storing at least one of words and sentences used by the call party at the time point at which the emotional change is detected as emotion estimation information, when the emotional change is detected.

8. The method of claim 1, further comprising:
   displaying a list of at least one piece of video call data stored at the time point at which the emotional change of the call party is detected, when a first event occurs; and
   when at least one piece of video call data is selected from the list of video call data, replaying the selected video call data.

9. The method of claim 8, further comprising:
   determining whether there is video call data stored at the time point when the emotional change of the call party is detected; and
   proceeding to displaying the list of video call data, when there is the video call data.

10. The method of claim 9, further comprising:
    displaying an indication that video call data stored at the time point when the emotional change of the call party is detected does not exist, when there is no video call data.

11. An electronic device comprising:
    at least one processor;
    a memory; and
    at least one program stored in the memory and configured to be executable by the processor,
    wherein the at least one program includes at least one instruction to:
    receive video call data;
    detect an emotional change of a call party using the received video call data; and,
    when the emotional change is detected, store the video call data at a time point at which the emotional change is detected.

12. The electronic device of claim 11, wherein the instruction to detect emotional change of a call party is configured to:
    estimate an emotion using video call data received at a first time point;
    estimate the emotion using video call data received at a second time point; and
    detect the emotional change by comparing the emotion estimated at the first time point with the emotion estimated at the second time point.

13. The electronic device of claim 12, wherein the first time point and the second time point are consecutive or are spaced apart from each other by a predefined time interval.

14. The electronic device of claim 12, wherein the instruction to estimate emotion is configured to estimate the emotion of the call party using at least one piece of information of video information and voice information included in the received video call data.

15. The electronic device of claim 11, wherein the instruction to store the video call data is configured to store the video call data during a predefined reference interval before or after the time point at which the emotional change is detected.

16. The electronic device of claim 11, wherein the instruction to store the video call data is configured to store the video call data during a reference interval starting from the time point at which the emotional change is detected.

17. The electronic device of claim 11, wherein the at least one program further includes an instruction to store at least one of words and sentences used by the call party at the time point at which the emotional change is detected as emotion estimation information, when the emotional change is detected.

18. The electronic device of claim 11, wherein the at least one program further includes an instruction to display a list of at least one piece of video call data stored at the time point at which the emotional change of the call party is detected, when a first event occurs, and when at least one piece of video call data is selected from the list of video call data, replay the selected video call data.

19. The electronic device of claim 18, wherein the at least one program further includes an instruction to determine whether there is video call data stored at the time point when the emotional change of the call party is detected, and display the list of video call data when there is the video call data.

20. The electronic device of claim 19, wherein the at least one program further includes an instruction to display an indication that video call data stored at the time point when the emotional change of the call party is detected does not exist, when there is no video call data.

* * * * *